June 11, 1957 C. N. JULIAN ET AL 2,795,700

HIGH FREQUENCY ADJUSTING SYSTEM

Filed July 6, 1954

INVENTORS
CHARLES N. JULIAN
FRANCOIS W. GAGNE
ERNEST GOSTYN
BY
ATTORNEYS 2,795,700
Patented June 11, 1957

2,795,700

HIGH FREQUENCY ADJUSTING SYSTEM

Charles Nelson Julian, North Amherst, Francois W. Gagne, Springfield, and Ernest Gostyn, Longmeadow, Mass., assignors to General Instrument Corporation, Elizabeth, N. J., a corporation of New Jersey Application July 6, 1954, Serial No. 441,326

4 Claims. (Cl. 250—40)

This invention relates to a system or mechanism for varying or adjusting the resonant frequency of, and/or the electrical coupling between, high frequency circuits, the mechanism being particularly adaptable for so-called printed circuits.

The prime object of the invention centers about the provision of a simplified system or mechanism for adjustment of high frequency circuits employing flat or planular, e. g., printed, reactance elements such as inductances or capacitances, or both. Such a system may be made to comprise an intermediate frequency tuning mechanism or a trimmer circuit for use in radio and television circuits.

To the accomplishment of this prime object, and such other objects as may hereinafter appear, the invention relates to the high frequency circuit adjusting system sought to be defined in the appended claims taken together with the following description and the accompanying drawings, in which:

Figures 1, 2, 3, 4, 5, 6, 7:
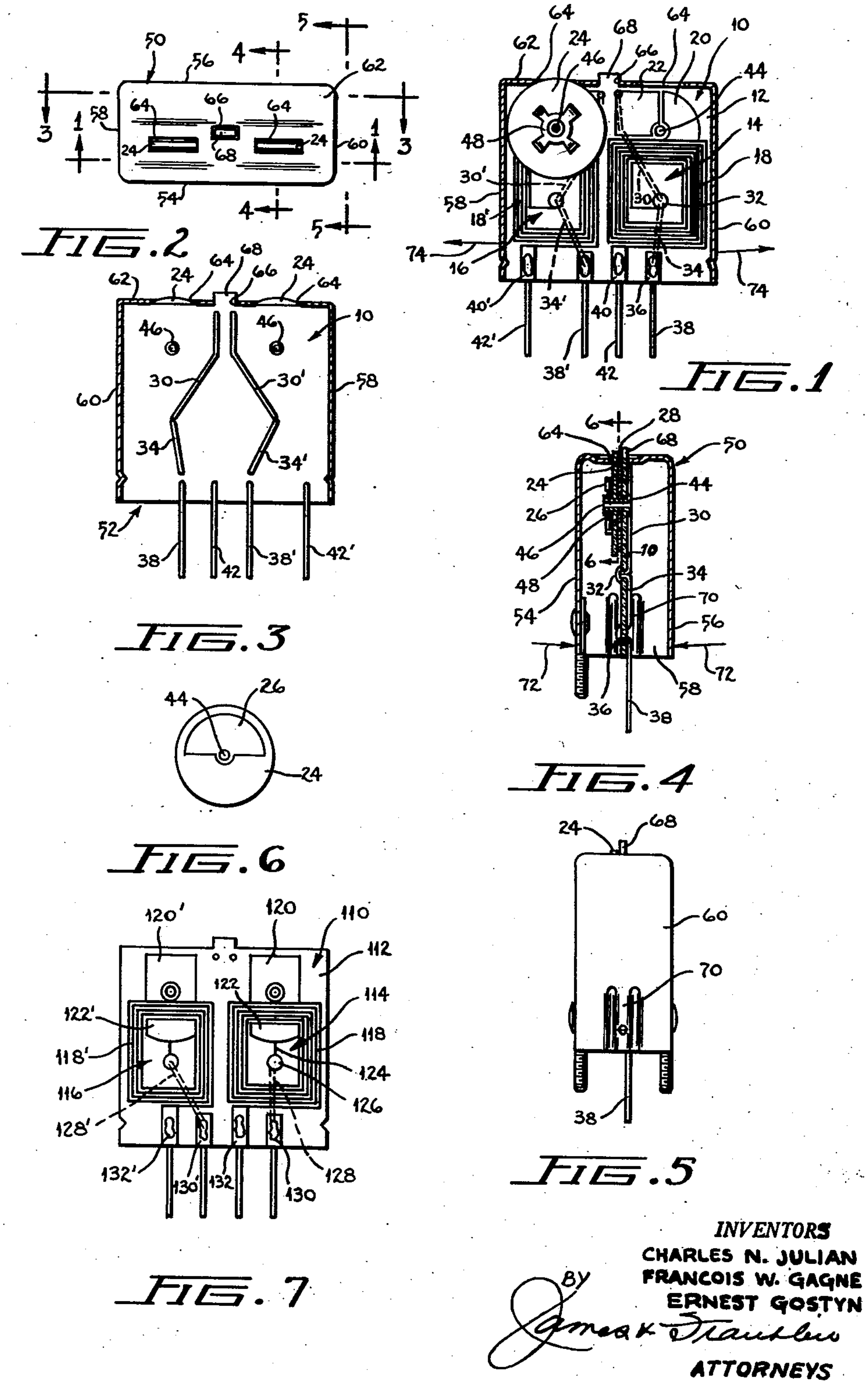
Fig. 1 is an elevational view of the circuit adjusting mechanism of the present invention, with the casing shield in which it is mounted shown in cross-section (which cross-section is taken in the plane of the line 1—1 of Fig. 2)
Fig. 2 is a top plan view of Fig. 1.
Fig. 3 is a view of the mechanism taken in cross-section in the plane of the line 3—3 of Fig. 2.
Fig. 4 is a view thereof taken in cross-section in the plane of the line 4—4 of Fig. 2.
Fig. 5 is a side elevational view taken in the plane of the line 5—5 of Fig. 2.
Fig. 6 is a view of the movable or adjusting element of the mechanism.
Fig. 7 is a front elevational view of the stationary part of the mechanism showing a modification thereof.

The essence of the high frequency circuit adjusting system of the present invention may be best explained by reference first to Figs. 1, 4 and 6 of the drawings. This system or mechanism comprises a flat insulator support 10 having in a face thereof, such as the front face 12, one or a plurality of high frequency circuits, two such circuits being shown in the exemplified embodiment, namely, a high frequency circuit 14 of one reactance or impedance and a second high frequency circuit 16 which may be of a different reactance or impedance. The circuit 14 comprises a flat inductance element 18 preferably of the so-called printed type, and two capacitance plates 20 and 22, also of the so-called printed type, connected, one to one end and the other to the other end of the inductance 18, in a manner to be presently described. The circuit 16 may be similar to the circuit 14, except that the values of inductance and capacitance may be different than those of the circuit 14.

Pivotally mounted on the insulator support for cooperation with said circuits are insulator wheels 24, one insulator wheel for each of said circuits, each wheel having a metallic vane element or plate 26 (which also may be of the printed type) in a face thereof (as is best shown in Fig. 6 of the drawings), said insulator wheel 24 being pivotally mounted for rotation on said insulator support 10 with said faces adjoining and in close contiguity, as best shown in Fig. 4 of the drawings, but being insulated from each other by a wafer-like dielectric medium (e. g., a wax paper disk) 28. The insulator wheel 24 is manually rotatable on the insulator support 10 to move the metallic vane or plate 26 thereof relatively to the circuit elements (the inductance or capacitance or both) of the circuit on the face of the insulator support 10 for adjusting the reactance of said circuit.

The circuit elements (inductance and capacitance) are connected in circuit arrangement as follows: the plate 22 is connected by means of the conductor 30 to the inductance terminal 32 which latter is connected by the conductor 34 to the circuit terminal 36 from which extends the lead 38. The condenser plate 20 is integrally connected to the outermost winding of the inductance 18 and this outermost winding is connected to the circuit terminal 40 from which extends the lead 42. The circuit elements of the circuit 16 are connected by similar parts which, for brevity, may be indicated by similar, but primed, reference characters. The insulator wheel 24, when rotated on its pivot 44 causes the vane or plate 26 thereof to move relatively to both the condenser or capacitance plates 20, 22 and the lumped inductance 18 so as to vary, in the illustrated embodiment, both the capacity of the capacitance plates and the inductance value of the inductance element. The construction may be so designed as to effect a variance of either the capacitive reactance or the inductive reactance of the circuit; but in the illustrated embodiment the rotation of the wheel 24 simultaneously varies both the inductance and the capacitance of the circuit, these being varied in the same direction so as to vary the tuning of the circuit.

The insulator support 10 and the insulator wheel 24 are made of flat or sheet insulating material; and it will be noted that the conductors (such as 30, 34 and 38, etc.) which connect the reactance elements to form the circuit are securely mounted on the rear face of the insulator support 10, the terminals thereof piercing or extending through the insulator support and being there soldered to the terminals as at 32 and 36. The circuit elements, including the conductors and the leads, thus form a rigid and well integrated unit. The insulator wheel 24 is pivotally mounted on the insulator support at 44 by means of a rivet 46 which parts are tightly held together by the use of a compression spring 48 held by one end of the rivet. This compression spring in conjunction with the frictional characteristics of the dielectric insulator 28 provides the required torque for resisting undesired rotation of the adjusting wheel 24.

The adjusting wheel 24 serves for thumbwheel adjustment of the circuit. The pivotal mounting 44, 46 of the wheel 24 is such that the periphery of the wheel (as best shown in Fig. 3 of the drawings) extends from an edge of the insulator support 10, the said insulator wheel being thus manually rotatable by thumb engagement of the extended periphery to rotate the metallic vane or plate 26 thereof relatively to the reactance element or elements of the circuit.

The circuit-adjusting mechanism described may be combined with a metallic shield 50 in which it is removably insertable. Said metallic shield comprises an open casing, open at the bottom 52, said casing having front and rear walls 54 and 56, opposite side walls 58 and 60 and a top wall 62. The circuit mechanism which, as aforesaid, comprises or may be handled as a unit, is removably insertable into the casing 50 through the open end 52 thereof and is mounted medially of said casing, the lateral dimension of the unit being such that the unit is snugly received between the side walls 58 and 60 of the casing, as is most clearly shown in Figs. 1, 3 and 4 of the drawings. The top wall 62 of the casing is provided with slots 64 (one for each of the circuits) for receiving, and through which projects, the periphery of the wheel 24, as best shown in Figs. 1, 3 and 4 of the drawings, so that the insulator wheel is manually rotatable by thumb engagement at said slot of the projecting periphery of the insulator wheel.

For suitably supporting the circuit unit in the shield casing the end wall 62 is also provided centrally with a perforation 66 through which projects an integral tab 68 of the insulator support 10 and the side walls 58 and 60 are provided with grooved formations 70, 70, the flat insulator support 10 being received by and supported in said casing grooves 70, 70. The construction of the shield casing is such that upon compression of the front and rear walls 54 and 56 in a direction indicated by the arrows 72, 72 (Fig. 4) the side walls 58 and 56 resiliently extend themselves in the direction indicated by the arrows 74, 74 (Fig. 1) to permit the free insertion or removal of the circuit element from the shield casing. Upon release of this compression the circuit unit is held firmly supported in the shield casing.

In Fig. 7 of the drawings we show a modified structure of the circuit unit designed to simplify the number of conductive elements employed in connecting the reactance elements. In this modification the insulator support 110 is provided on its front face 112 with two circuits 114 and 116, the circuit 114 including the lumped inductance 118, a condenser plate 120 connected to the outermost loop or winding of the inductance and a condenser plate 122 connected to the innermost winding or loop of the inductance. The condenser plate 122 is connected by the short conductor 124 to the inductance terminal 126 and the latter is connected, in turn, by the conductor 128 to the lead terminal 130. The outer end of the inductance coil is connected in turn to the lead terminal 132. By this arrangement the number of conductor elements mounted on the rear face of the insulator support is minimized. The circuit 116 comprises similar reactance elements, similarly connected, and the parts thereof are indicated by similar, but primed, reference characters.

The use and operation of the high frequency circuit adjusting system of the present invention will, in the main, be apparent from the above detailed description of the structure and operation. By means of the present construction a number of salient advantages, in addition to those described above, are obtained, among which may be cited the following:

(*a*) Tuning of a circuit is easily accomplished without tools, by reason of the projection of the thumb wheels through the slots in the shield;

(*b*) Where the use of an alignment tool is preferred (to prevent tampering or de-tuning) the mechanism can be recessed below the level of the shield;

(*c*) Essentially linear adjustment characteristics, as contrasted with "screw-in" mechanisms;

(*d*) The thumb wheel type of mechanism requires a minimum space since during adjustment it does not shift its position in space;

(*e*) The adjustment is not affected by vibration or other accelerative forces, by reason of the symmetry of mass of the thumbwheel about its mounting center;

(*f*) Various vane patterns can easily be applied to the thumbwheel by means of circuit printing techniques; and (*g*) De-tuning effects due to warping of the coil strip or other cooperating printed surfaces are minimized due to the thumbwheel being spring loaded tightly against such cooperating surfaces.

While we have shown the mechanism of the invention in its preferred forms, it will be understood that these have been shown merely by way of example and not by way of limitation, and that many changes may be made in the structure and in the design without departing from the spirit of the invention defined in the following claims.

We claim:

1. An electrical circuit adjusting system comprising a metallic shield casing open at one end and provided with a slot at the opposite end, a circuit unit removably insertable into said casing through the open end thereof, said circuit unit comprising a flat insulator support having a reactance element in a face thereof, an insulator wheel having a metallic vane element in a face thereof, said insulator wheel being pivotally mounted for rotation on said insulator support with said faces adjoining and in close contiguity but insulated from each other, the pivotal mounting of the insulator wheel being such that the periphery of the wheel extends from the insulator support and projects through the slot in said casing, said insulator wheel being manually rotatable by thumb engagement at said slot of the projecting periphery to rotate said metallic vane relatively to the reactance element for adjusting the reactance of said reactance element.

2. An electrical circuit adjusting system comprising a metallic shield open end casing having front and rear walls, opposite side walls and a top wall, said side walls being provided with grooves and said top wall being provided with a slot, a circuit unit removably insertable into said casing through the open end thereof, said circuit unit comprising a flat insulator support received by and supported in said casing grooves and having a reactance element in a face thereof, an insulator wheel having a metallic vane element in a face thereof, said insulator wheel being pivotally mounted for rotation on said insulator support with said faces adjoining and in close contiguity but insulated from each other, the pivotal mounting of the insulator wheel being such that the periphery of the wheel extends from an edge of the insulator support and projects through the slot in said casing, said insulator wheel being manually rotatable by thumb engagement at said slot of the projecting periphery to rotate said metallic vane relatively to the reactance element for adjusting the reactance of said reactance element.

3. The electrical circuit adjusting system of claim 1 in which the reactance element comprises separate and connected inductance and capacitance elements, and in which the insulator wheel is manually rotatable to rotate the metallic vane thereof relatively to both the inductance and capacitance for adjusting the tuning of said circuit.

4. The electrical circuit adjusting system of claim 2 in which the reactance element comprises separate and connected inductance and capacitance elements, and in which the insulator wheel is manually rotatable to rotate the metallic vane thereof relatively to both the inductance and capacitance for adjusting the tuning of said circuit.

References Cited in the file of this patent

UNITED STATES PATENTS

| | | |
|---|---|---|
| 1,647,474 | Seymour | Nov. 1, 1927 |
| 1,782,368 | Scheibel | Nov. 18, 1930 |
| 1,909,685 | Kenney | May 16, 1933 |
| 2,629,860 | Chesus et al. | Feb. 24, 1953 |
| 2,638,544 | Schreiner | May 12, 1953 |

OTHER REFERENCES

RCA Developmental Printed-Circuit IF-Transformers, Coils and Traps, 1952.

National Bureau of Standards Circular 192, "New Advances in Printed Circuits," November 22, 1948.